United States Patent
McCormick

(10) Patent No.: US 11,671,162 B1
(45) Date of Patent: Jun. 6, 2023

(54) CROSS-POLARIZATION INTERFERENCE COMPENSATION

(71) Applicant: Space Exploration Technologies Corp., Hawthorne, CA (US)

(72) Inventor: Martin S. McCormick, El Segundo, CA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

(21) Appl. No.: 17/230,659

(22) Filed: Apr. 14, 2021

Related U.S. Application Data

(60) Provisional application No. 63/009,918, filed on Apr. 14, 2020.

(51) Int. Cl.
H04B 7/08 (2006.01)
H04L 5/14 (2006.01)
H04B 7/00 (2006.01)
H04B 1/12 (2006.01)

(52) U.S. Cl.
CPC .......... H04B 7/0845 (2013.01); H04B 1/126 (2013.01); H04B 7/002 (2013.01); H04L 5/14 (2013.01)

(58) Field of Classification Search
CPC ... H01Q 15/24; H01Q 13/0258; H01Q 15/244
See application file for complete search history.

(56) References Cited

U.S. PATENT DOCUMENTS

| | | | |
|---|---|---|---|
| 2005/0286665 A1* | 12/2005 | Resheff | H04B 7/10 375/350 |
| 2007/0116162 A1* | 5/2007 | Eliaz | H04L 25/03057 375/350 |
| 2013/0188579 A1* | 7/2013 | Touboul | H04B 7/0413 370/329 |

(Continued)

OTHER PUBLICATIONS

B. Kearney, et al.; Adaptive Cross Polarization Interference Cancellation for Satellite Downlinks; Architecture Trades and Performance Analysis; 2013 IEEE Military Communications Conference; IEEE Computer Society; pp. 278-283; (2013).

(Continued)

*Primary Examiner* — Ayaz R Sheikh
*Assistant Examiner* — Debebe A Asefa
(74) *Attorney, Agent, or Firm* — Polsinelli PC

(57) ABSTRACT

In an embodiment, a cross-polarization interference compensation module is included in a receiver of a wireless communication system. The module includes first and second input lines configured to receive respective first and second down-converted digital polarized signals based on receipt of a wireless transmission. The module further includes first and second output lines electrically coupled to at least one modem. The module further includes a first complex finite impulse response (FIR) filter configured to receive the second down-converted digital polarized signal and generate a correction factor that cancels cross-polarization components in the first down-converted digital polarized signal. The module further includes a first filter coefficient engine in communication with the first complex FIR (Continued)

filter and configured to adapt the first complex FIR filter over time based on the first and second down-converted digital polarized signals.

32 Claims, 9 Drawing Sheets

(56) References Cited

U.S. PATENT DOCUMENTS

2015/0117572 A1* 4/2015 Xu .......................... H01P 1/161
375/340
2020/0366000 A1* 11/2020 Cardona, Jr. ............ H01Q 3/36

OTHER PUBLICATIONS

Author Unknown; Propagation Data and Prediction Methods Required for the Design of Earth-Space Telecommunication System; International Telecommunication Union; Recommendation ITU-R P.618-13; ITU-R Radiocommunication Sector of ITU; (Dec. 2017).
P. Noel, et al.; Doubling the Trough-Put of a Digital Microwave Radio System by the Implementation of a Cross-Polarization Interference Cancellation Algorithm; DragonWave; ResearchGate; DOI: 10.1109/RWS.2012.6175360; 5 Pages; Jan. 2012.

* cited by examiner

CROSS-POLARIZATION INTERFERENCE COMPENSATION

CROSS-REFERENCE TO RELATED APPLICATION

The present application claims priority to U.S. Provisional App. No. 63/009,918 filed Apr. 14, 2020, the contents of which are incorporated herein by reference.

BACKGROUND

Wireless communication systems configured to transmit and receive two or more independent data-bearing signals at the same time using the same frequency band effectively double the capacity of wireless communication links. These types of communication systems are referred to as polarization-division multiplexing communication systems. Data is separately encoded in distinct spatial mode signals such as in a left-hand circular polarization (LHCP) mode signal and a right-hand circular polarization (RHCP) mode signal. A LHCP signal and a RHCP signal are simultaneously propagated in the same communication link. Such signals may also be referred to as dual-polarized signals or different spatial mode signals. The separately polarized signals can be propagated in the same communication link, but then separated and decoded at a receiver.

Various non-idealities can be associated with dual-polarized signals employed in wireless communication systems. Non-idealities cause undesirable depolarization which leads to cross-polarization interference between the two different spatial mode signals. During depolarization, the signal component of a first polarized signal of a first polarization is converted or "leaked" into a second polarized signal of a second polarization intended for a given receiver, thereby contributing to the noise or interference level of the receiver. Depolarization can be caused by imprecise pointing of the transmit or receiver antennas, or atmospheric effects such as, but not limited to, rain, fog, snow, or ice crystals. If the transmitter and receiver are in relative motion, for example when communicating between the ground and non-geostationary orbit (NGO) satellite, the depolarization can change rapidly in time, as the communication link varies in its pointing direction and the satellite crosses through different portions of the atmosphere.

Imperfect isolation between signal chain components used to generate and receive the dual-polarized signals in wireless communication systems is another contributor to the total cross-polarization interference.

Depolarization that causes cross-polarization interference may be more acute for wireless communication systems operating at higher frequencies. Wideband communication systems also tend to exaggerate depolarization effects due to cross-polarization dispersion or delay spread across different frequencies within the channel.

BRIEF DESCRIPTION OF THE DRAWINGS

The foregoing aspects and many of the attendant advantages of the embodiments of the present disclosure will become more readily appreciated as the same become better understood by reference to the following detailed description, when taken in conjunction with the accompanying drawings, wherein.

BRIEF INTRODUCTION

Figure 1:
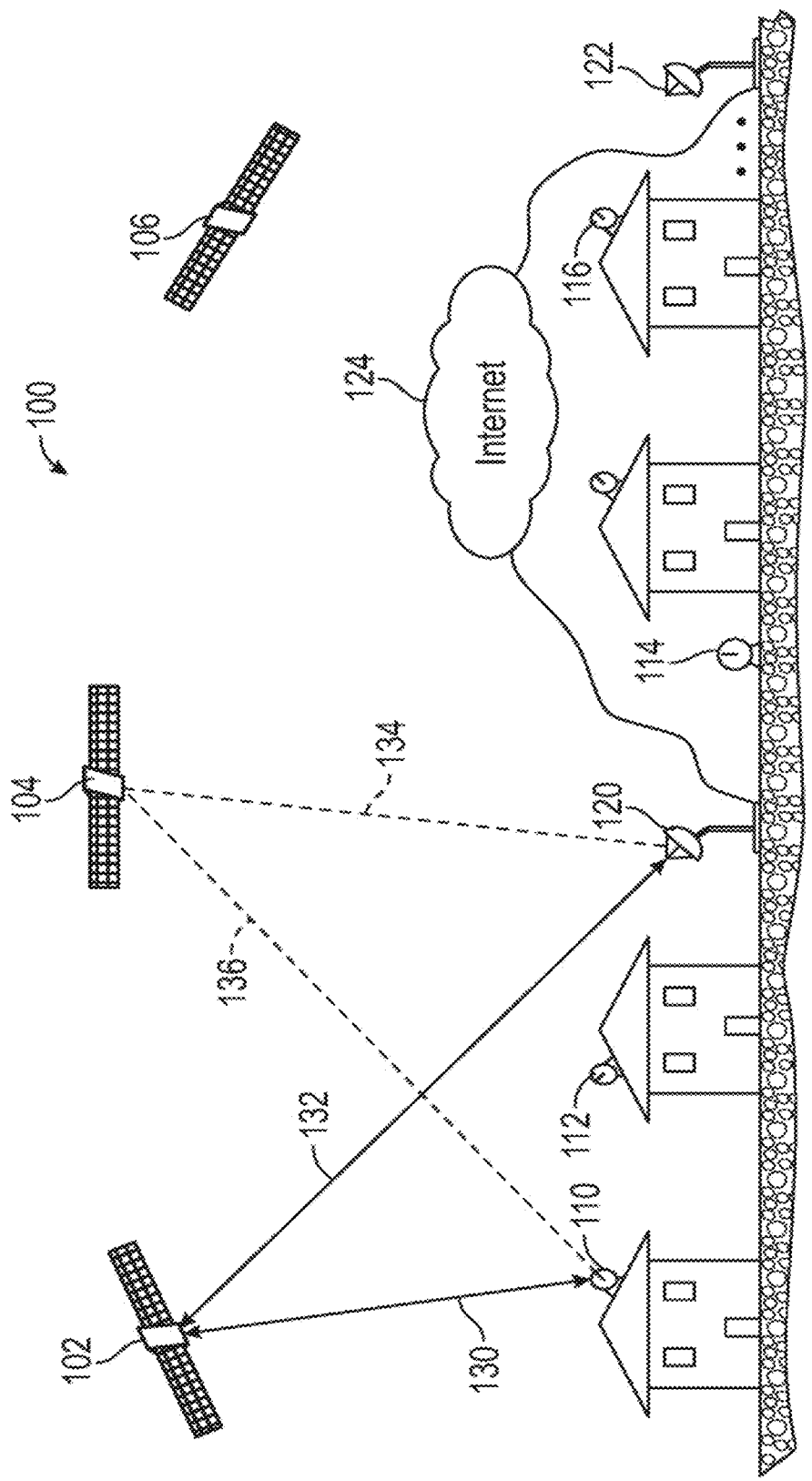
FIG. 1 illustrates a diagram showing an example wireless communication system in accordance with various aspects of the present disclosure.

Embodiments of apparatuses and methods are disclosed that relate to cross-polarization interference compensation techniques. Some systems can transmit on the same frequency a first signal with a first polarization and a second frequency having a second polarization. The combined signal can experience cross-polarization interference due to a number of different factors. It would be advantageous for a wireless communication system to quickly compensate for cross-polarization interference, without requiring computational complexity. It would be advantageous for the wireless communication system to provide cross-polarization interference compensation without changing, complicating, or otherwise impacting normal operations of the system. Such a cross-polarization interference compensation scheme should be accurate and/or to address the effects of moving nodes of the wireless communication systems such as the Doppler effect which becomes relevant due to the speed at which satellites travel. Accordingly, embodiments of the present disclosure are directed to these and other improvements in wireless communication systems or portions thereof.

In some embodiments that provide cross-polarization interference correction, a communication system includes a transmitter including an orthomode transducer (OMT) and an antenna. The OMT is configured to combine a first polarized signal and a second polarized signal into a combined polarized signal to provide to the antenna for transmission, the first polarized signal having a different polarization than the second polarized signal. The system includes a receiver including a cross-polarization interference compensation (XPIC) module having a first input line and a second input line and a first output line and a second output line. The XPIC module is configured to receive, based on receipt of the transmitted combined polarized signal from the antenna, a first down-converted digital polarized signal associated with the first polarized signal at the first input line and a second down-converted digital polarized signal associated with the second polarized signal at the second input line. The module includes a first complex-valued finite impulse response (FIR) filter configured to receive the second down-converted digital polarized signal and output a correction factor that cancels cross-polarization components in the first down-converted digital polarized signal. The XPIC module is configured to generate a first corrected polarized signal based on the first down-converted digital polarized signal and the correction factor and to provide the first corrected polarized signal at the first output line. The first output line electrically couples with a receiver modem.

The XPIC module can include a second complex-valued FIR filter configured to receive the first down-converted digital polarized signal and output a second correction factor that cancels cross-polarization components in the second down-converted digital polarized signal. The XPIC module can be configured to generate a second corrected polarized signal based on the second down-converted digital polarized signal and the second correction factor and to provide the second corrected polarized signal at the second output line. The second output line electrically couples with a first receiver modem. In this manner, the cross-polarization components of the first signal and the second signal can both be cancelled using the respective correction factor.

A method embodiment of providing correction of cross-polarization interference in a combined signal can include receiving a first down-converted signal, the first down-converted signal being based on a received combined signal at a cross-polarization interference compensation module and receiving a second down-converted signal, the second down-converted signal being based on the received combined signal. The method can include generating, based on the second down-converted signal, a correction factor that cancels out cross-polarization components in the first down-converted signal. The method can further include generating a first corrected polarized signal based on the first down-converted signal and the correction factor and providing the first corrected polarized signal to a first output line.

The method can further include generating, based on the first down-converted signal, a second correction factor that cancels out cross-polarization components in the second down-converted signal and generating a second corrected polarized signal based on the second down-converted signal and the correction factor. The second corrected polarized signal can be provided to a second output line. The received combined signal can include a dual-polarized signal as noted above.

These and other aspects of the present disclosure will be more fully described below.

DETAILED DESCRIPTION

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "top surface", "bottom surface", "vertical", "horizontal", and "lateral" in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or processor-executable instructions, including routines executed by a programmable computer, processor, controller, chip, and/or the like. Those skilled in the relevant art will appreciate that the technology can be practiced on computer/controller systems other than those shown and described above. The technology can be embodied in a special-purpose computer, controller, or processor that is specifically programmed, configured or constructed to perform one or more of the computer-executable instructions described above. Accordingly, the terms "computer," "controller," "processor," or the like as generally used herein refer to any data processor and can include Internet appliances and hand-held devices (including palm-top computers, wearable computers, cellular or mobile phones, multi-processor systems, processor-based or programmable consumer electronics, network computers, mini computers, and the like). Information handled by these computers can be presented at any suitable display medium, including an organic light emitting diode (OLED) display or liquid crystal display (LCD).

FIG. 1 illustrates a diagram showing an example wireless communication system 100 in accordance with various aspects of the present disclosure. System 100 can include a satellite-based communication system including a plurality of satellites orbiting Earth in, for example, a non-geostationary orbit (NGO) constellation. It is understood that system 100 can also include any of a variety of wireless communication systems such as, but not limited to, a low earth orbiting (LEO) communication system, a non-earth based communication system, a ground-based communication system, a space-based communication system, and/or the like.

Of the plurality of satellites including the satellite constellation, at least three satellites of the plurality of satellites (e.g., satellites 102, 104, and 106) are shown in FIG. 1 for illustrative purposes. System 100 further includes ground or Earth based equipment configured to communicate with the plurality of satellites, such equipment including a plurality of user equipment and a plurality of gateways. User equipment 110, 112, 114, and 116 of the plurality of user equipment are shown in FIG. 1. Gateways 120, 122 of the plurality of gateways are also shown in FIG. 1. Each of the satellites, user equipment, and gateways within system 100 is also referred to as a node, system node, communication node, and/or the like.

Each user equipment of the plurality of user equipment is associated with a particular user. User equipment is configured to serve as a conduit between the particular user's device(s) and a satellite of the plurality of satellites which is in communication range of the user equipment, such that the particular user's device(s) can have access to a network 124 such as the Internet. Each user equipment is particularly positioned in proximity to the associated user's device(s). For example, user equipment 110, 112, and 116 are located on the respective users' building roof and user equipment 114 is located on a yard of the user's building. A variety of other locations are also contemplated for the user equipment. User equipment may also be referred to as user terminals, end use terminals, end terminals, user ground equipment, and/or the like.

At any given time, a communication link established between a particular satellite and a particular user equipment facilitates access to the network 124 by the user associated with the particular user equipment. One or more user devices (e.g., a smartphone, a tablet, a laptop, an Internet of Things (IoT) device, and/or the like) is in wireless communication with user equipment 110 via WiFi. If, for example, the user requests a web page via a user device, the user device relays the request to user equipment 110. User equipment 110 can establish a communication link 130 to the satellite 102 and transmit the request. Satellite 102, in response, establishes a communication link 132 with an accessible gateway 120 to relay the request. The gateway 120 has wired connections to the network 124. The data associated with rendering the requested web page is returned in the reverse path, from the gateway 120, communication link 132, satellite 102, communication link 130, user equipment 110, and to the originating user device. The requested web page is then rendered on the originating user device.

If satellite 102 moves out of position relative to user equipment 110 before the requested data can be provided to user equipment 110 (or otherwise becomes unavailable), then gateway 120 establishes a communication pathway 134, 136 with a different satellite, such as satellite 104, to provide the requested data.

In some embodiments, one or more gateway of the plurality of gateways can include repeaters that lack a wired connection to the network 124. A repeater is configured to relay communications to and/or from a satellite that is a different satellite from the one that directly communicated with a user equipment or gateway. A repeater is configured to be part of the communication pathway between a user equipment and gateway. A repeater may be accessed in cases where a satellite does not have access to a gateway, and thus has to send its communication to another satellite that has access to a gateway via the repeater. Repeaters can be located terrestrially, on water (e.g., on ships or buoys), in airspace below satellite altitudes (e.g., on an airplane or balloon), and/or other Earth-based locations. Accordingly, the plurality of gateways may also be referred to as Earth-based network nodes, Earth-based communication nodes, and/or the like.

In some embodiments, one or more transmitter system and one or more receiver system are included in each user equipment, satellite, and gateway (and repeater) of system 100. If a node includes more than one transmitter system, the respective transmitter systems may be the same or different from each other. More than one receiver system included in a node may similarly be the same or different from each other.

Figure 2:
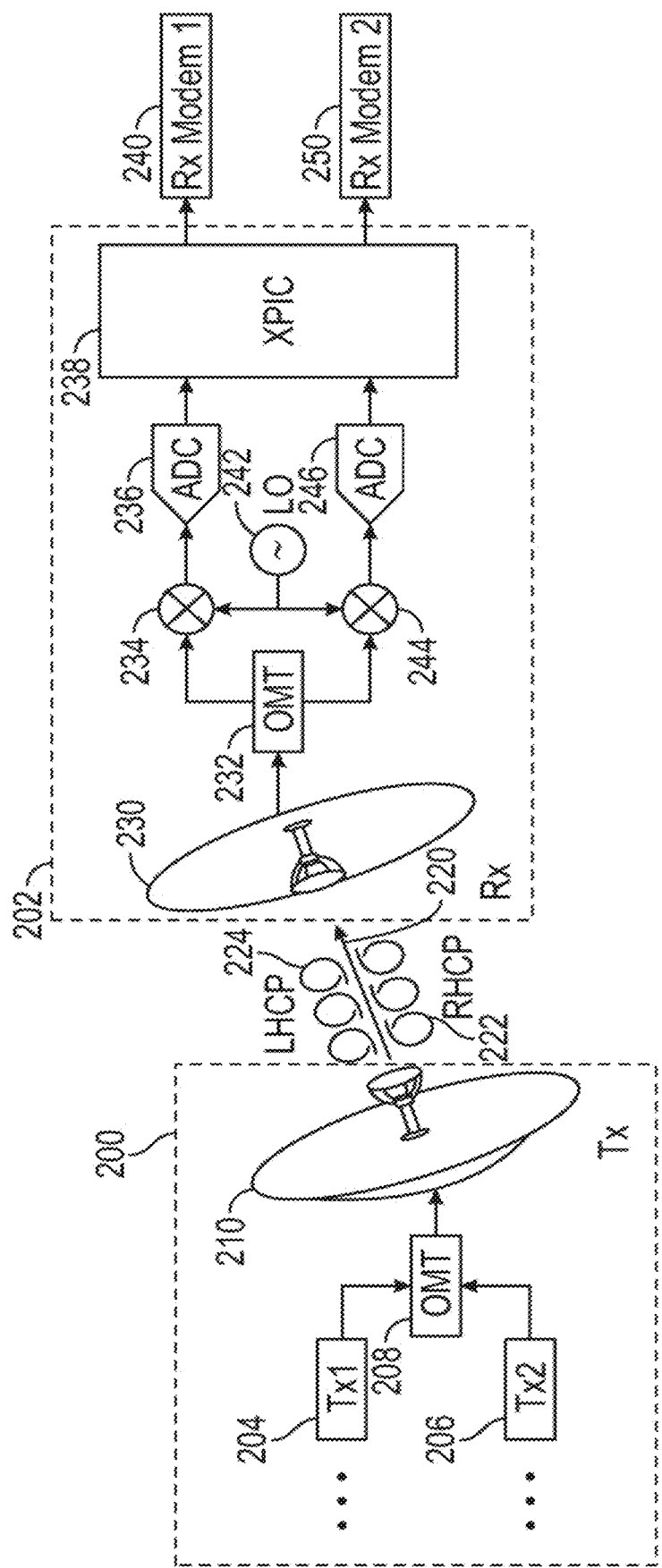
FIG. 2 illustrates a block diagram showing at least a portion of an example transmitter system and at least a portion of an example receiver system in accordance with various aspects of the present disclosure.

FIG. 2 illustrates a block diagram showing at least a portion of an example transmitter system 200 and at least a portion of an example receiver system 202 in accordance with various aspects of the present disclosure. In some embodiments, systems 200 and 202 are included in any node of system 100 that communicates dual-polarized signals in the same communication channel at the same time. Accordingly, system 100 is also referred to as a polarization-division multiplexing system. For example, a system 200 can be included in gateway 120 and a system 202 can be included in satellite 102 for gateway 120 and satellite 102 to respectively transmit and receive dual-polarized signals simultaneously. In another aspect, the signals may not be transmitted and/or received simultaneously. Likewise, a system 202 can be included in the gateway 120 and a system 200 can be included in the satellite 102 for the gateway 120 and the satellite 102 to respectively transmit and receive dual-polarized signals.

System 200, also referred to as a transmission system, transmitter, or Tx, is configured to encode two data signals or streams to be transmitted via a wireless communication link 220 to system 202 in separate distinct spatial modes of radio frequency (RF) signals and to transmit such distinct spatial modes signals at the same time (or near the same time) using the same frequency band. In some embodiments, system 200 includes first and second transmit chains 204 and 206, an orthomode transducer (OMT) 208, and at least one antenna 210.

The first transmit chain 204 is configured to receive a first data stream or signal from a first transmit modem (not shown), and to generate a first spatial mode RF signal suitable for providing to OMT 208. The first transmit chain 204 includes the first transmit path equipment, the first transmit path components, Tx 1, and/or the like. The first transmit chain 204 includes, without limitation, one or more of a plurality of beamformers, phase shifters, time delay filters, digital-to-analog converters (DACs), frequency mixers, power amplifiers (PAs), a baseband section, a modulation section, and/or the like.

The second transmit chain 206 is configured to receive a second data stream or signal from a second transmit modem (not shown), and to generate a second spatial mode RF signal suitable for providing to OMT 208. The second transmit chain 206 includes the second transmit path equipment, the first transmit path components, Tx 2, and/or the like. The second transmit chain 206 is similar to first transmit chain 204 except it is configured to process the second data signal which is different from the first data signal.

The first and second transmit modems can collectively include a single modem or a plurality of modems. In one aspect, the first and second transmit modems can be on the same node, such as a UT 110 (See FIG. 1) or may be on different nodes such as the first transmit modem being on a first UT 110 and a second transmit modem being on a second UT 112, as shown in FIG. 1. In one aspect, signals transmitted from the first UT 110 and the second UT 112 are initially transmitted at different times to take into consideration Doppler effects due to the movement of the SAT 102, such that the signals can be combined in the air interface into the same radio frame. In this regard, the first signal from the first UT 110 can have one polarization and the second signal from the second UT 112 can have a second polarization, such that the combined signal is processed as described herein.

First and second spatial mode RF signals can include two RF signals having distinct or different spatial modes from each other. In some embodiments, the distinct or different spatial modes include different polarizations, orthogonal polarizations, left-hand circular polarization (LHCP) and right-hand circular polarization (RHCP), vertical polarization (VPOL) and horizontal polarization (HPOL), and/or the like. A combined signal can include, for example, a first signal that is LHCP and a second signal that is RHCP.

OMT 208 is configured to combine or couple together the first and second spatial mode RF signals, and to provide the combined signal to antenna 210 for transmission. OMT 208 is also referred to as a polarization duplexer, orthomode coupler, and/or the like. Antenna 210 can include one or more antennas. If antenna 210 is implemented as a single antenna, antenna 210 may include a parabolic antenna. If antenna 210 is implemented as a plurality of antennas, antenna 210 may include a phased array antenna. The combined RF signal outputted by OMT 208 and radiated by antenna 210 has first and second spatial mode signal components 222, 224 (e.g., RHCP and LHCP).

The combined RF signal propagates over-the-air to be received by receiver system 202. System 202, also referred to as a receiver or Rx, is configured to decode the received combined RF signal, reconstitute the first and second data signals (or depolarized mixture thereof), and apply cross-polarization interference compensation (XPIC). In some embodiments, system 202 includes at least one antenna 230, an OMT 232, down-converters 234 and 244, analog-to-digital converters (ADCs) 236 and 246, a XPIC module or component 238, and a local oscillator (LO) 242.

Antenna 230 is configured to receive the combined RF signal propagated over-the-air via communication link 220. The output of antenna 230 can include the input to OMT 232. OMT 232 is configured to provide two outputs which include the respective inputs to down-converters 234 and 244. The outputs of down-converters 234, 244 include the respective inputs to ADCs 236, 246. The outputs of ADCs 236, 246 include inputs to XPIC module 238. Down-converters 234, 244 are clocked by LO 242 as would be understood by those of skill in the art. Two parallel receiver pathways or chains are thus defined within system 202.

Antenna 230 can include one or more antennas. If antenna 230 is implemented as a single antenna, antenna 230 may include a parabolic antenna. If antenna 230 is implemented as a plurality of antennas, antenna 230 may include a phased array antenna.

OMT 232 is configured to separate or decouple the different spatial mode signal components 222, 224 included in the combined RF signal received by antenna 230. First spatial mode signal component 222 is provided to down-converter 234 and second spatial mode signal component 224 is provided to down-converter 244. Alternatively, first and second spatial mode signal components 222, 224 may be provided to down-converters 244, 234, respectively. OMT 232 is also referred to as a polarization de-duplexer, orthomode decoupler, and/or the like.

Down-converters 234, 244 are configured to down convert the first and second spatial mode signal components 222, 224, respectively, to remove the carrier frequency from the signals. The down-converted signals, which include analog signals, are converted to digital signals via ADCs 236, 246. The digitized signals outputted by ADCs 236, 246 are provided to XPIC module 238. XPIC module 238 is configured to apply cross-polarization interference compensation or correction to the digitized signals, as will be described in detail below. The corrected signals output to respective modems 240, 250 include reconstituted first and second data signals/streams originating in system 200.

One or more non-idealities cause depolarization or cross-polarization interference (XPI) between the two spatial mode signals. Sources of non-idealities include, without limitation, atmospheric effects, imperfect isolation of components included in systems 200 and/or 202, system operation at higher frequencies, and/or wideband operation. Examples of atmospheric effects include rain, fog, snow, and/or ice crystals causing time-varying differential rotations of the propagating transmissions. Examples of imperfect isolation of components included in systems 200 and/or 202 include reflections off of radomes, splash plates, OMTs, and/or other structures; coupling and/or reflections between printed circuit board (PCB) traces, cables, antenna elements, and/or phased array antenna; imperfect antenna axial ratios; and/or other effects. These non-idealities can arise when the combined signal is generated at a single node, or whether a first node and a separate second node each generate a respective signal (with a respective polarization for example) that is combined in the air-interface.

Cross-polarization interference may be magnified in systems operating at higher frequencies such as when systems 200 and 202 operate in the Ka-band. Both the magnitude of couplings and the rate of change in time increases at higher frequencies. In wideband communication systems (e.g., a system transmitting and receiving signals configured in a plurality of frequency bands within each channel), different depolarization sources can contribute interference with different relative delays in time (dispersion). Depolarization can occur in the case where one UT 110 transmits a first signal with a first polarization and at a first distance from the SAT 102 and a second UT 112 transmits a second signal with a second polarization at a second distance from the SAT 102, and wherein the signals are to be combined over the air into the same radio frame. As such, whether from different nodes or from a same node, a cross-polarization dispersion or delay spread causes different cross-polarization interference effects at different frequencies within the channel.

XPIC module 238 is configured to correct for one or more or all of the above cross-polarization interference effects. XPIC module 238 and associated XPIC technique disclosed herein operates at digital baseband using digital signal processing. This allows for higher cancellation performance in wideband, high-throughput communication systems.

It is understood that although modems 240 and 250 are shown in FIG. 2, modems 240 and 250 may be implemented as a single modem or as separate modems on different nodes as well. Modem 240 may also be referred to as receiver modem 1, Rx modem 1, modem 1, and/or the like. Modem 250 may also be referred to as receiver modem 2, Rx modem 2, modem 2, and/or the like. System 202 may further include one or more receiver components such as, but not limited to, low noise amplifiers (LNAs), phase shifters, and/or the like.

Figure 3:
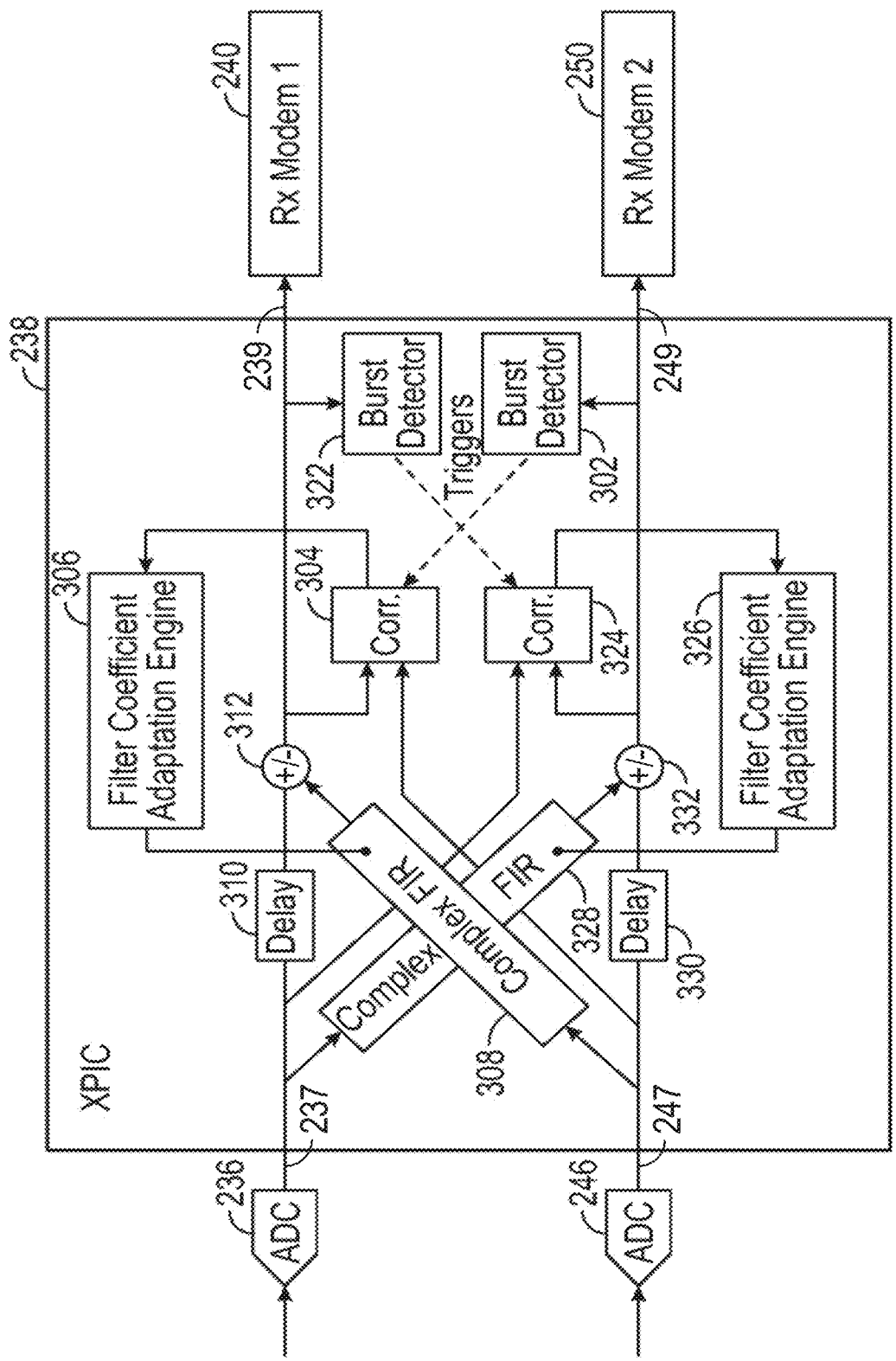
FIG. 3 illustrates a block diagram showing details of a cross-polarization interference cancellation (XPIC) module included in the receiver system in accordance with various aspects of the present disclosure.
Figure 4A:
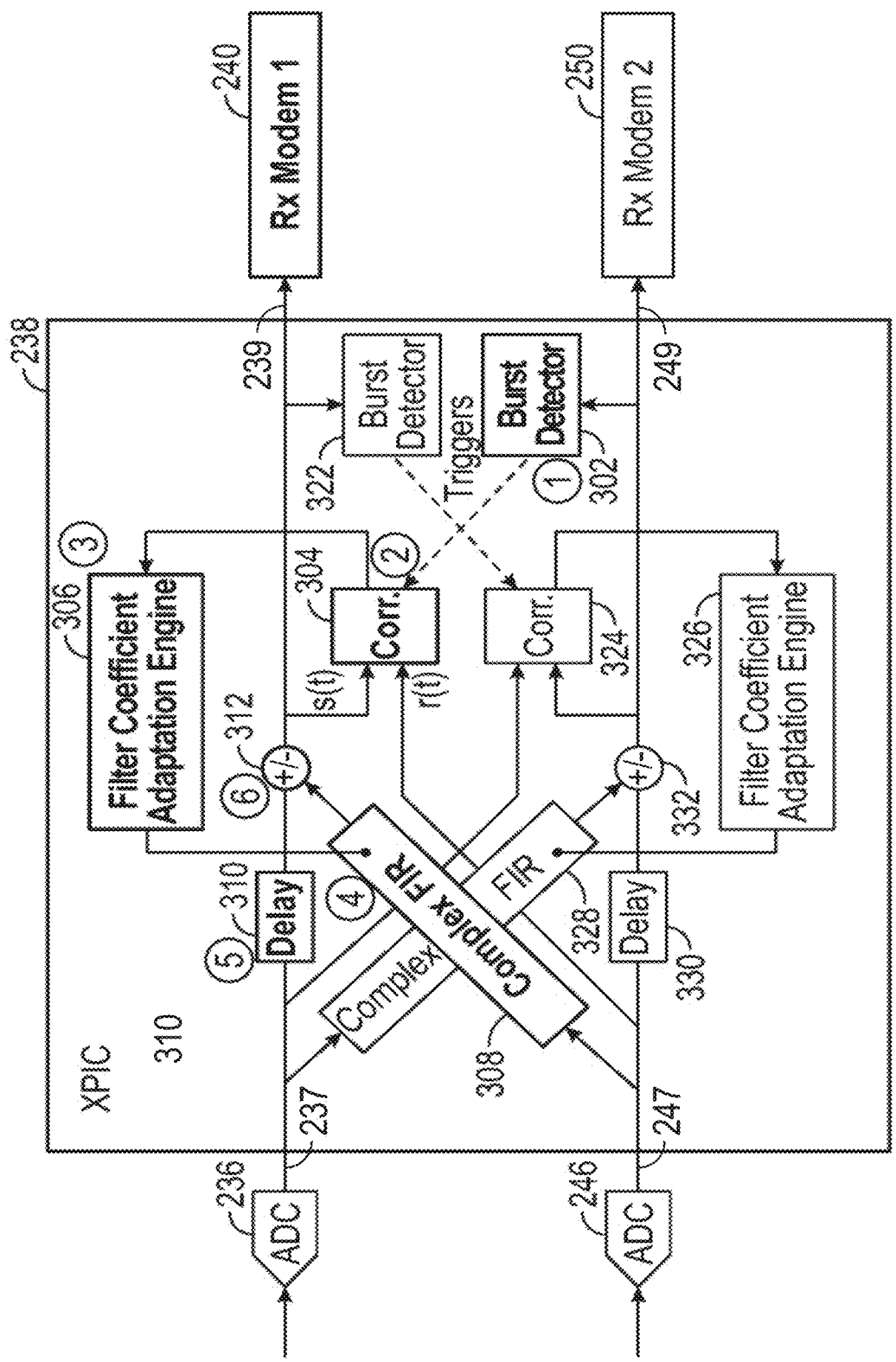
FIG. 4A illustrates a block diagram showing highlighted portions of the XPIC module of FIG. 3 associated with correcting the digitized signal outputted by an analog to digital converter (ADC) and intended for a modem in accordance with various aspects of the present disclosure.
Figure 4B:
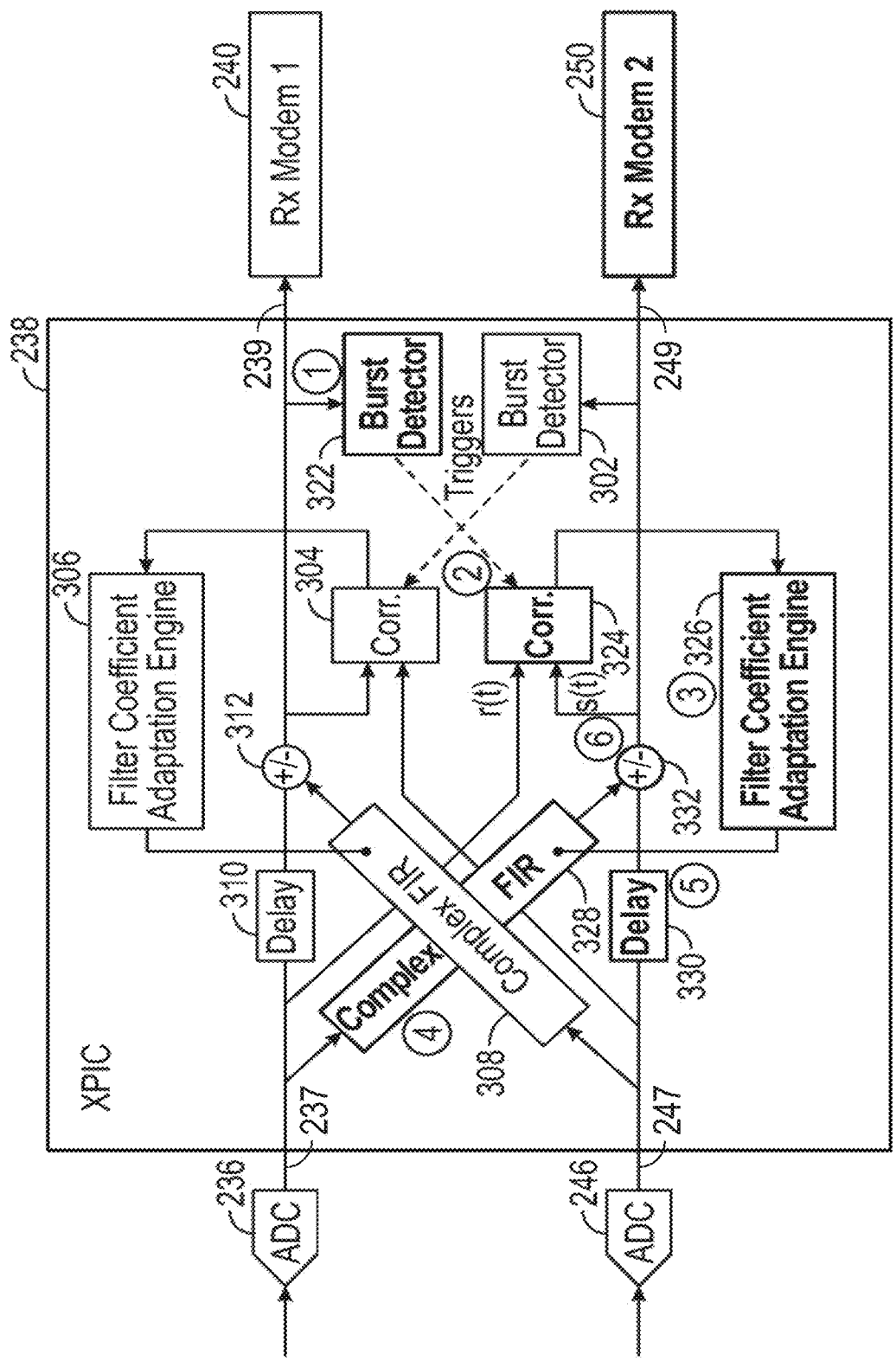
FIG. 4B illustrates a block diagram showing highlighted portions of the XPIC module of FIG. 3 associated with correcting the digitized signal outputted by another ADC and intended for another modem in accordance with various aspects of the present disclosure.
Figure 5A:
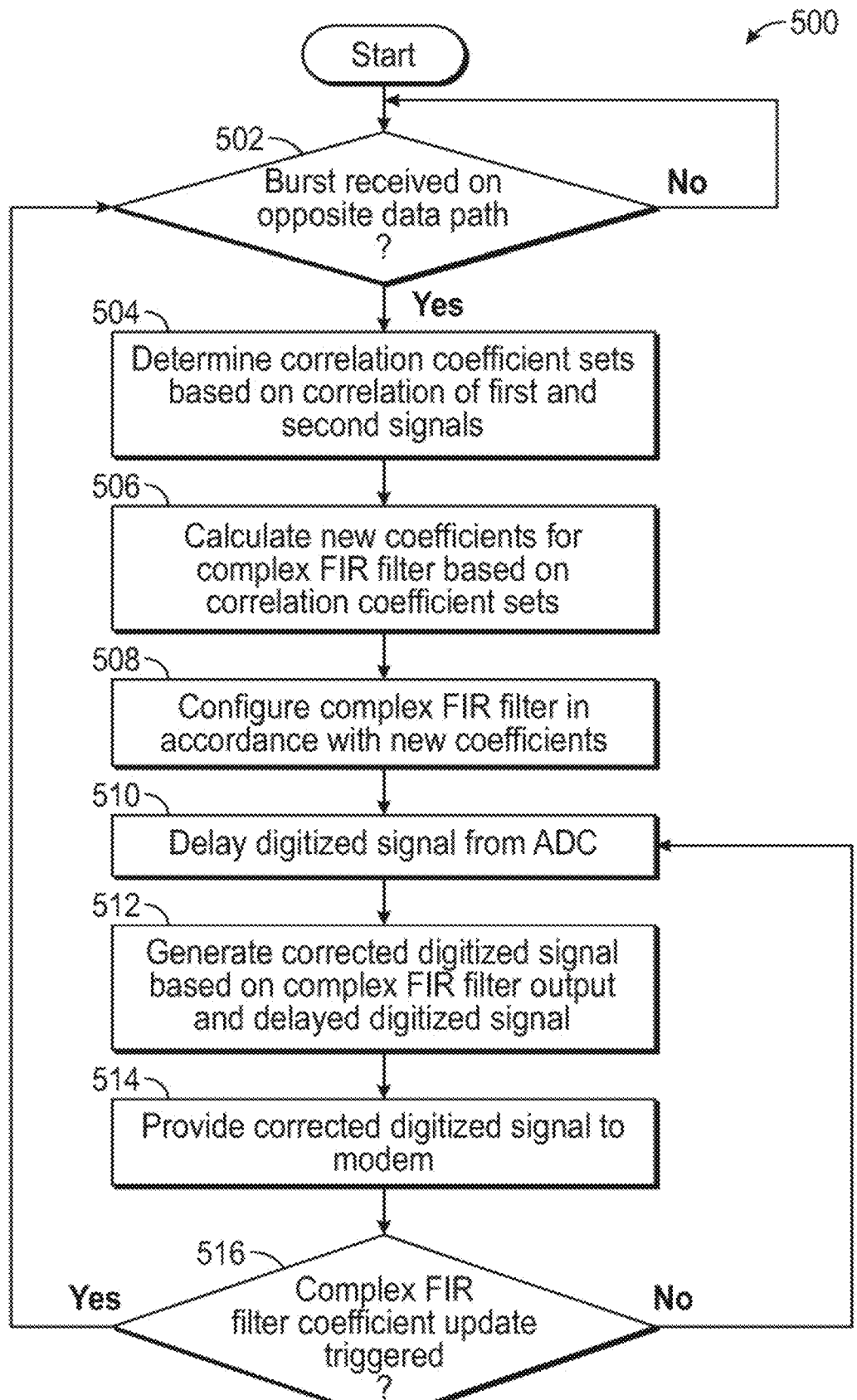
FIG. 5A illustrates a flow diagram showing a process for performing complex-valued finite impulse response (FIR) filter coefficient adaptation and application of the correction for each signal path to a modem in accordance with various aspects of the present disclosure.
Figure 5B:
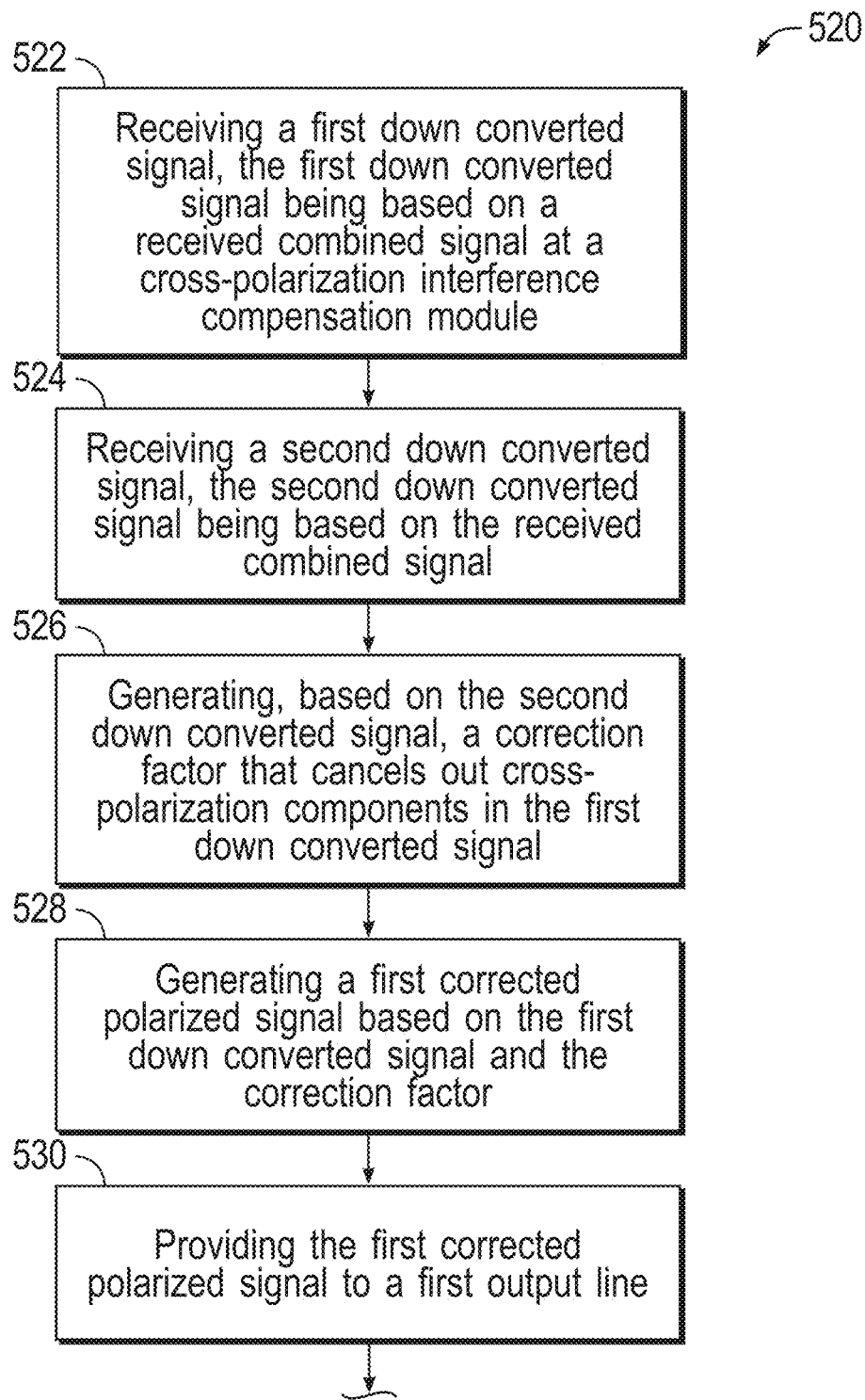
FIG. 5B illustrates a method embodiment of providing a correction of the digitized signals in accordance with various aspects of the present disclosure.
Figure 5B:
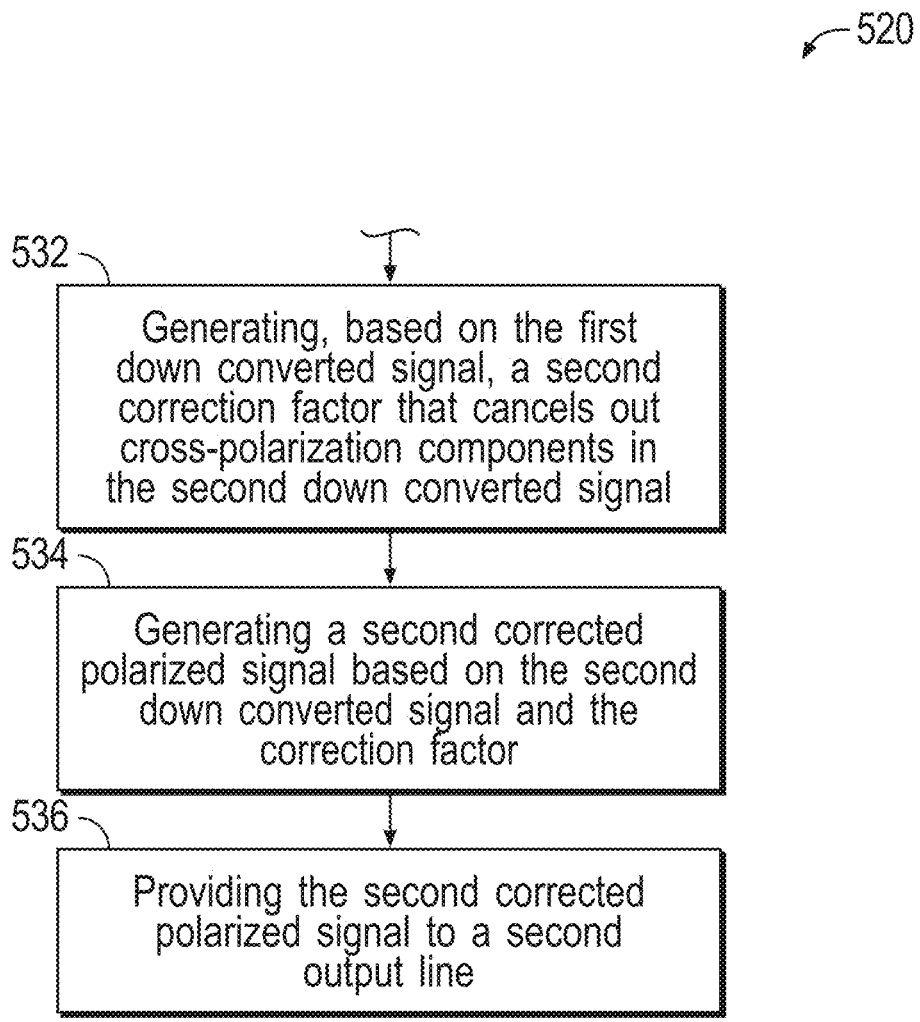

FIG. 3 illustrates a block diagram showing details of XPIC module 238 in accordance with various aspects of the present disclosure. FIG. 4A illustrates a block diagram showing highlighted portions of XPIC module 238 associated with correcting the digitized signal outputted by ADC 236 and intended for modem 240 in accordance with various aspects of the present disclosure. FIG. 4B illustrates a block diagram showing highlighted portions of XPIC module 238 associated with correcting the digitized signal outputted by ADC 246 and intended for modem 250 in accordance with various aspects of the present disclosure. FIG. 5A illustrates a flow diagram showing a process 500 for performing complex finite impulse response (FIR) filter coefficient adaptation and application of the correction for each signal path to either modem 240 or 250 in accordance with various aspects of the present disclosure. FIG. 5B illustrates a method embodiment for providing correction due to depolarization.

Referring to FIG. 3, XPIC module 238 includes, without limitation, first and second input lines 237, 247; first and second output lines 239, 249; burst detectors 302, 322; correlators 304, 324; filter coefficient adaptation engines 306, 326; complex FIR filters 308, 328; delay taps 310, 330; and adder/subtractors 312, 332. Burst detector 302 is electrically coupled between adder/subtractor 332 and modem 250. Correlator 304 is electrically coupled between ADC 246 and filter coefficient adaptation engine 306. Filter coefficient adaptation engine 306 is electrically coupled between correlator 304 and output of complex FIR filter 308. Complex FIR filter 308 is electrically coupled between ADC 246 and adder/subtractor 312. Delay tap 310 is electrically coupled between ADC 236 and adder/subtractor 312. The adder/subtractor 312 is electrically coupled between delay tap 310 and modem 240. Burst detector 322 is electrically coupled between adder/subtractor 312 and modem 240. Correlator 324 is electrically coupled between ADC 236 and filter coefficient adaptation engine 326. Filter coefficient adaptation engine 326 is electrically coupled between correlator 324 and the output of complex FIR filter 328. Complex FIR filter 328 is electrically coupled between ADC 236 and adder/subtractor 332. Delay tap 330 is electrically coupled between ADC 246 and adder/subtractor 332. The adder/subtractor 332 is electrically coupled between delay tap 330 and modem 250.

In some embodiments, before the first digitized signal output by ADC 236 is provided to modem 240, the first digitized signal (also referred to as a first down-converted digital polarized signal associated with the first polarized signal, first digitized or digital signal associated with the first spatial mode signal, and/or the like) is input to the first input line 237 of XPIC 238. The first digitized signal is delayed by delay tap 310 and is corrected of undesirable polarization that "leaked" in from the second spatial mode signal. Such correction is applied to the first digitized signal via adder/subtractor 312. The correction is generated in accordance with a XPIC technique or scheme implemented using components 302-312, as shown highlighted in FIG. 4A. The output of adder/subtractor 312 (referred to as a first corrected digitized signal, first corrected digital signal, first corrected spatial mode data signal, and/or the like) is provided on the first output line 238 of XPIC 238 and can include the input to modem 240. Modem 240 performs demodulation and further processing on the first corrected digitized signal. The signal chain or pathway defined by delay tap 310 and adder/subtractor 312 between ADC 236 and modem 240 is referred to as the top or first data path. Hence, components 302-312 are considered to be associated with "cleaning" the signals on the top or first data path.

Similarly, before the second digitized signal output by ADC 246 is provided to modem 250, the second digitized signal (also referred to as a second down-converted digital polarized signal associated with the second polarized signal, second digitized or digital signal associated with the second spatial mode signal, and/or the like) is input to the second input line 247 of XPIC 238. The second digitized signal is delayed by delay tap 330 and is corrected of undesirable polarization that "leaked" in from the first spatial mode signal. Such correction is applied to the second digitized signal via adder/subtractor 332. The correction is generated in accordance with a XPIC technique or scheme implemented using components 322-332, as shown highlighted in FIG. 4B. The output of adder/subtractor 332 (referred to as a second corrected digitized signal, second corrected digital signal, second corrected spatial mode data signal, and/or the like) is provided on the second output line 249 of XPIC 238. The second corrected digitalized signal can be input to modem 250. Modem 250 performs demodulation and further processing on the second corrected digitized signal. The signal chain or pathway defined by delay tap 330 and adder/subtractor 332 between ADC 246 and modem 250 is referred to as the bottom or second data path. Hence, components 322-332 are considered to be associated with "cleaning" the signal on the bottom or second data path.

The correction applied to the first digitized signal can include the second digitized signal filtered by complex FIR filter 308. The first corrected digitized signal can include the first digitized signal "cleaned" of undesirable coupling from the second digitized signal. A similar type of correction can be applied to the second digitized signal using the complex FIR filter 328 to remove undesirable coupling from the first digitized signal. As such, the function of components 302-312 are symmetrical to the function of components 322-332.

The cross-polarization interference cancellation disclosed herein uses a digital, adaptive, complex-valued FIR filter 308, 328 to achieve cancellation of the interference from undesirable polarization. Complex FIR filter 308 removes interference present in the first digitized signal traversing the top/first data path and complex FIR filter 328 removes interference present in the second digitized signal traversing the bottom/second data path. The particular coefficients of the complex FIR filters 308, 328 are associated with achieving good cancellation of the interfering polarization. These coefficients are changed or adapted over time to account for changes in the polarization coupling characteristics (e.g., changes in atmospheric conditions, pointing angles, temperature fluctuations, aging of various sub-components of the analog signal chains, and/or the like). Accordingly, XPIC module 238 is configured to be adaptive in real-time (or near real-time) based on the characteristics of the received signals.

FIG. 4A shows burst detector 302, correlator 304, filter coefficient adaptation engine 306, complex FIR filter 308, delay tap 310, and adder/subtractor 312 respectively defining a chain or path for a complex FIR filter 308 coefficient adaptation and cross-polarization interference cancellation technique for the top/first data path and first digitized signal.

In some embodiments, the dual-polarized signals transmitted by transmitter system 200 originate in burst-mode modems. Accordingly, the dual-polarized signals, and by extension, each of the first and second digitized signals can include at least one radio frame subdivided into a plurality of bursts in the time domain, with each burst of the plurality of bursts delineated from the other polarization by a unique burst identifier. Each burst includes the payload or data to be transmitted as provided by the transmitter burst-mode modems. A respective burst can include data from a single node or data combined as transmitted from several different nodes.

At a block 502 of FIG. 5A, burst detector 302 is configured to determine whether a burst has been received (or is present) on the opposite data path (e.g., the bottom/second data path) from the data path being corrected (e.g., the top/first data path). Burst detector 302 is configured to detect an a priori known unique sequence, code word, identifier, and/or other header included in a radio frame of the second digitized signal intended for modem 250. Such burst identifier is unique to the polarization intended for modem 250 and may also be referred to as an interference burst header sequence, interference sequence, and/or the like. Burst detector 302 is electrically coupled between adder/subtractor 330 and modem 250. In some embodiments, burst detector 302 can include a time domain matched filter configured to filter against a known burst identifying sequence. Alternatively, burst detector 302 may include a frequency domain matched filter or employ other burst detection techniques.

If no burst is detected (no branch of block 502), then process 500 continues to wait for a burst on the opposite data path. If a burst is detected (yes branch of block 502), then process 500 proceeds to a block 504. The detection of a burst at block 502 triggers or starts the correlator 304. Correlator 304 performs an independent correlation on two different inputs—the first input including the output of complex FIR filter 308 after the adder/subtractor 312 (the first corrected digitized signal outputted by adder/subtractor 312 and denoted as s(t)) and the second input can include the signal input to complex FIR filter 308 (the second digitized signal from ADC 246 and denoted as r(t)). Both of the first and second inputs are correlated against the particular interference sequence detected by the burst detector 302 at block 502.

Correlator 304 is configured to determine and generate two sets of correlation coefficients based on the independent correlations of the first and second inputs against the interference sequence. The sets of correlation coefficients quantify the degree of correlation between the inputs and the interference sequence. The correlation coefficients are computed with multiple time lags (e.g., +/−8 samples) to form two sets of cross-correlation sequences. These sets include the input to the filter coefficient adaptation engine 306.

Next, at a block 506, the filter coefficient adaptation engine 306 is configured to calculate new complex-valued coefficients for complex FIR filter 308 based on the correlation coefficient sets from correlator 304, as will be described in detail below. The new coefficients output from filter coefficient adaptation engine 306 include a control input to complex FIR filter 308.

Complex FIR filter 308, also referred to as the complex-valued FIR filter, is configured in accordance with the new coefficients, at a block 508. Complex FIR filter 308 determines and generates a correction to be applied to the first digitized signal that will remove the cross-polarization present in the first digitized signal. The output of complex FIR filter 308 can include the correction to be applied.

The first digitized signal outputted by ADC 236 is delayed by a particular amount of time by delay tap 310, at a block 510. Delay tap 310 is configured to delay the first digitized signal by an amount equal to approximately half the maximum time delay of the complex FIR filter 308. For example, if complex FIR filter 308 has a seven tap time delay (each with a real and imaginary coefficient component), then the delay value associated with delay tap 310 can be three samples long (3 tap delay). It is understood that block 510 may be performed or started simultaneous with or prior to any of blocks 502-508 in accordance with different timing requirements of one or more components 302-312. For example, without limitation, block 510 may be performed prior to block 504.

The delayed first digitized signal and the output of complex FIR filter 308 (the correction to be applied) include the inputs to adder/subtractor 312. The adder/subtractor 312 is configured to subtract or remove the output of the complex FIR filter 308 from the delayed first digitized signal, thereby removing the undesirable cross-polarization component present in the first digitized signal. The output of adder/subtractor 312 can include the first corrected digitized signal generated for the top/first data path, at a block 512. The adder/subtractor 312 is also referred to as a subtractor, an adder, combiner, summation component, and/or the like configured to apply the corrective factor outputted by complex FIR filter 308 to the delayed first digitized signal so as to result in the first corrected digitized signal.

The first corrected digitized signal, a clean signal free of cross-polarization interference or noise, is provided to modem 240 for demodulation and further processing, at a block 514.

Next, at a block 516, whether the coefficients of complex FIR filter 308 should be adapted or updated is checked. In some embodiments, while the cross-polarization interference in the first digitized signals are continuously corrected, the coefficients of complex FIR filter 308 can be updated intermittently. Adaptation of the filter coefficients can be triggered by any of, without limitation, a pre-set adaptation rate, a pre-set number of bursts, desired level of cancellation falling below a threshold, cross-polarization interference channel characteristics, and/or the like. The rate at which adaptation occurs may depend on the rate of change in the cross-polarization interference channel and/or the level of cancellation desired. The rate of change relates to the cross-polarization coupling gain and phase and how quickly that can change with time. The rate of change can be due to moisture in the atmosphere or cloud movement. The highest adaptation rate possible is the rate of bursts available to the receiver, but in practice, adaptation can occur at a slower rate than the burst rate. Cross-polarization interference channel characteristics may vary at rates of less than 10 degrees per second. As such, adaptation updates can occur at rates as low as 10 Hz to maintain a cross-polarization discrimination error of less than 1 degree.

If an adaptation is triggered (yes branch of block 516), then process 500 returns to block 502 to perform the next update or adaptation of the coefficients of complex FIR filter 308. If an adaptation is not triggered (no branch of block 516), then process 500 proceeds to block 510 to continue correction of successive first digitized signals provided by ADC 236. Even if a burst is detected by burst detector 302, burst detector 302 may be set not to trigger correlator 304 if no adaptation is triggered at block 516. The last coefficients provided by engine 306 to complex FIR filter 308 continue to be used to generate the correction to apply to successive first digitized signals. In other words, the same correction can be applied to all of the delayed first digitized signals until the coefficients of complex FIR filter 308 are updated in response to the burst detector 302 trigger event.

A corresponding similar filter coefficient adaptation and cross-polarization interference cancellation process also can occur for the second digitized signal and bottom/second data path. Such process is similar to process 500 except the functions of burst detector 302, correlator 304, filter coefficient adaptation engine 306, complex FIR filter 308, delay tap 310, and adder/subtractor 312 described above are instead performed by respective burst detector 322, correlator 324, filter coefficient adaptation engine 326, complex FIR filter 328, delay tap 330, and adder/subtractor 332. Such process causes the second corrected digitized signal to be generated on the bottom/second data path and provided to modem 250. FIG. 4B shows burst detector 322, correlator 324, filter coefficient adaptation engine 326, complex FIR filter 328, delay tap 330, and adder/subtractor 332 respectively defining a chain or path for a complex FIR filter 328 coefficient adaptation and cross-polarization interference cancellation technique for the bottom/second data path.

The adaptation and correction processes for the first and second digitized signals, also referred to as first and second processes, respectively, can occur simultaneously of each other, interleaved in time relative to each other, asynchronously with each other, and/or the like. Because each adaptation and correction process updates a complex FIR filter 308, 328 which corrects a signal provided to an intended modem as well as a burst detector associated with the other adaptation and correction process chain, it may be beneficial, in some embodiments, for the first and second processes to interleave to improve burst detection on both chains. For example, updates to complex FIR filter 308 can be used to correct the delayed first digitized signal. The first corrected digitized signal outputted by adder/subtractor 312 can include the input to each of modem 240 and burst detector 322.

First and second processes occur independently of each other in the sense that each process uses dedicated components (e.g., components 302-312 for the first process and components 322-332 for the second process). As can be seen in FIG. 3, the arrangement of ADC 236, modem 240, and components 302-312 are symmetrical about an imaginary line running parallel between the top and bottom data path with respective ADC 246, modem 250, and components 322-332. In an embodiment, components 322-332 may be optional in XPIC module 238 if components 302-312 are configured to perform both the first and second processes in a time-sharing arrangement. In another aspect, delays and data storage could be implemented to enable the same set of components to generate the correction data for each of the top and bottom data path.

Returning to FIG. 5A, at block 502, the burst detector 302 looks for the presence of a known transmitted sequence $x_n = \{x_1, x_2, \ldots, x_N\}$ in the second (corrected) digitized signal (the signal that is causing cross-polarization interference in the first digitized signal). If such known transmitted sequence is detected at a time $t_0$, burst detector 302 issues a trigger to begin correlation in correlator 304. Correlator 304 receives as inputs, the first input that is a signal s(t)— representing the waveform or signal passed to modem 240 (e.g., first corrected digitized signal)—and the second input that is a reference signal r(t)—representing the input waveform or signal to the associated complex FIR filter 308 (e.g., second digitized signal).

In response to the trigger issued by burst detector 302, correlator 304 computes the following correlation coefficient sets $c_l$ and $a_l$, at block 504:

$$c_l = \{c_{-L}, c_{-L+1}, \ldots, c_{-2}, c_{-1}, c_0, c_1, c_2, \ldots, c_{L-1}, c_L\}$$

$$a_l = \{a_{-L}, a_{-L+1}, \ldots, a_{-2}, a_{-1}, a_0, a_1, a_2, \ldots, a_{L-1}, a_L\}$$

$$c_l = \sum_{n=1}^{N} conj(x_n) * s(t_0 + l - n)$$

$$a_l = \sum_{n=1}^{N} conj(x_n) * r(t_0 + l - n)$$

where L is the number of taps in complex FIR filter 308 (e.g., 7), and N is the length of the known transmitted sequence $x_n$ of the second (corrected) digitized signal (e.g., the signal or waveform causing the cross-polarization in the other signal to be cleaned). Sequence $x_n$ represents the known interference burst header sequence associated with the cross-polarization causing waveform of received reference signal r(t).

In instances where Doppler or carrier frequency offset exists in the waveforms/signals received by receiver system 202, the measured Doppler frequency offset can be removed prior to the correlation. The resulting coefficients $c_l$ and $a_l$, or in vector form, $\vec{c}$ and $\vec{a}$, are then passed to the filter coefficient adaptation engine 306.

If the sequence $x_n$ has a non-trivial autocorrelation function, the inverse of the autocorrelation matrix (normally pre-computed) can be applied to the coefficients so that they then represent the instantaneous finite impulse response channel estimate between the cross-polarization (interfering) transmitter and the two receiver signals s(t) and r(t). However, applying the autocorrelation matrix inverse can also be omitted.

Engine 306 is configured to calculate filter coefficients based on received cross-correlation coefficient vectors, $\vec{c}$ and $\vec{a}$, passed to engine 306, at block 506. In some embodiments, engine 306 computes the following:

$$\vec{H} = \frac{DFT\{\vec{c}\}}{DFT\{\vec{a}\}}$$

where DFT represents discrete Fourier transform (e.g., implemented with fast Fourier transform), and the division is performed element-wise on the frequency-domain values. Because the correlation coefficient vector $\vec{a}$ was generated based on the burst detection of sequence $x_n$, which is the primary component in r(t), the denominator is expected to be large and nonzero at all frequencies within the bandwidth of $x_n$. For frequencies outside the bandwidth of $x_n$, the corresponding values of $\vec{H}$ are set to zero.

The complex-valued coefficients $\vec{w}$ of complex FIR filter 308 are then updated according to, $$\vec{w} = \vec{w} + \mu DFT^{-1}\{\vec{H}\}$$

where μ is a small (real-valued) step size parameter.

Burst detector 322 and engine 326 associated with correction of the second digitized signal performs similar calculations during the second adaptation and correction process.

In some embodiments, burst detector 302, engine 306, burst detector 322, and/or engine 326 can include hardware, firmware, circuitry, software, and/or combinations thereof to facilitate various aspects of the adaptation and correction processes described herein. Burst detector 302, engine 306, burst detector 322, and/or engine 326 may also be referred to as modules, logic, instructions, algorithms, and/or the like.

One or more of burst detector 302, engine 306, burst detector 322, and/or engine 326 (or a portion thereof) can include one or more instructions embodied within a tangible or non-transitory machine (e.g., computer) readable storage medium or device, which when executed by a machine (such as a computer processor) causes the machine to perform the operations described herein. One or more processors, controllers, microcontrollers, microprocessors, and/or the like included in or used by burst detector 302, engine 306, burst detector 322, and/or engine 326 can be configured to execute the instructions. In an embodiment, one or more of burst detector 302, engine 306, burst detector 322, and/or engine 326 (or a portion thereof) can be implemented as firmware or hardware such as, but not limited to, an application specific integrated circuit (ASIC), programmable array logic (PAL), field programmable gate array (FPGA), virtual machines or in a virtual environment, and/or the like. In other embodiments, one or more of burst detector 302, engine 306, burst detector 322, and/or engine 326 (or a portion thereof) may be implemented as software while other of the burst detector 302, engine 306, burst detector 322, and/or engine 326 (or a portion thereof) may be implemented as firmware and/or hardware.

In this manner, a high performance cross-polarization interference compensation technique for wide-band, high-throughput communications is disclosed herein. The compensation technique implemented in XPIC module 238 functions without requiring synchronization or time alignment of transmissions among the polarizations. If a system in which synchronization is required, such as for systems with independent data for each type of polarization, implementation of independent transmitters would be negatively impacted. System latency would also be increased in synchronization-requiring systems due to resynchronization of each transmission burst and/or symbol.

The technique disclosed herein does not rely on decision feedback in the receiver system 202. Hence, the technique is not subject to conditions such as low signal-to-noise ratios under which feedback decisions tend to be inaccurate, which in turn degrades cross-polarization compensations calculated therefrom. Receiver decision feedback also tends to take considerable time, which can lead to large delays in adaptation.

Ground based communication systems or GEO satellite communication systems have minimal susceptibility to a Doppler effect because there is little relative motion between transmitter and receiver. For NGO satellite communication systems, this is not the case and the Doppler effect is thus not negligible. The present technique is configured to take into account the Doppler effect and in some cases can take into account different nodes, such as different UTs 110, 112, transmitting different signals that are combined into a radio frame.

As discussed above, the complex FIR filters 308, 328 need not be continuously adapted for the XPIC module 238 to provide effective cross-polarization compensation. The present technique is not susceptible to phase noise. Compensation techniques susceptible to phase noise require tracking the channel continuously to provide quality compensation.

The present technique is implemented using burst-mode modems and is capable of handling any channel phase shift (e.g., due to the Doppler effect, carrier offset, or LO phase noise) that can disrupt cancellation at the beginning of a burst due to a large unknown phase error in the signal. Even though the present technique provides highly accurate compensation, the computations are not intensive nor take a long time to obtain. Thus, the present technique is suitable for providing fast updates and/or for use in wideband communications applications. In some embodiments, system 200 and/or 202 can include a wideband communication system operating at a frequency bandwidth of at least 480 MegaHertz (MHz).

FIG. 5B illustrates a method 520 for providing correction for digitized signals. The method includes receiving a first down-converted signal, the first down-converted signal being based on a received combined signal at a cross-polarization interference compensation module (522), receiving a second down-converted signal, the second down-converted signal being based on the received combined signal (524), generating, based on the second down-converted signal, a correction factor that cancels out cross-polarization components in the first down-converted signal (526), generating a first corrected polarized signal based on the first down-converted signal and the correction factor (528) and providing the first corrected polarized signal to a first output line (530).

The method can further include generating, based on the first down-converted signal, a second correction factor that cancels out cross-polarization components in the second down-converted signal (532), generating a second corrected polarized signal based on the second down-converted signal and the correction factor (534) and providing the second corrected polarized signal to a second output line (536). The received combined signal can include a dual-polarized signal.

Figure 6:
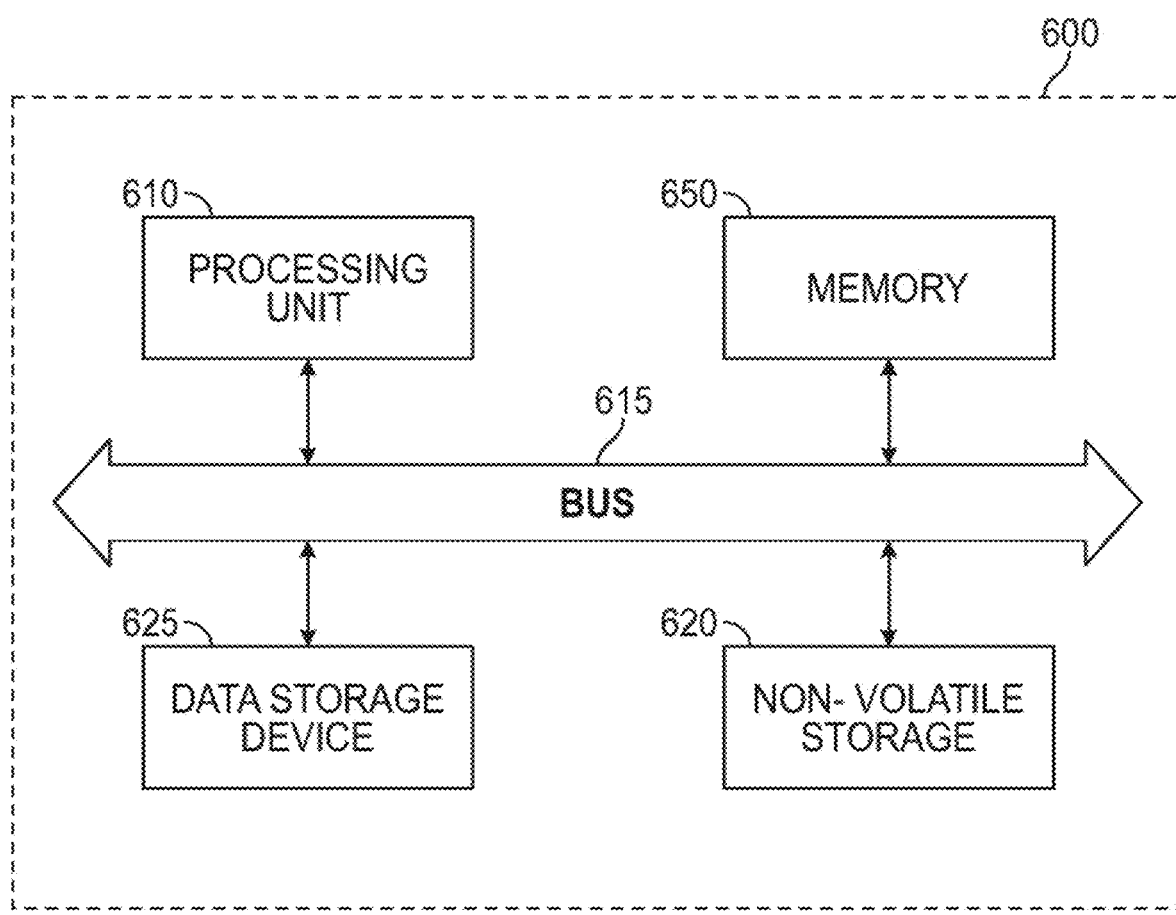
FIG. 6 illustrates a block diagram showing an example platform or device that can be implemented in the system in accordance with various aspects of the present disclosure.

FIG. 6 illustrates a block diagram showing an example platform or device that can be implemented in the system 100 in accordance with various aspects of the present disclosure. Platform 600 can include at least a portion of any of burst detector 302, engine 306, burst detector 322, and/or engine 326. Platform 600 as illustrated includes bus or other internal communication means 615 for communicating information, and processor 610 coupled to bus 615 for processing information. Platform 615 further can include random access memory (RAM) or other volatile storage device 650 (alternatively referred to herein as main memory), coupled to bus 615 for storing information and instructions to be executed by processor 610. Main memory 650 also may be used for storing temporary variables or other intermediate information during execution of instructions by processor 610. Platform 600 also can include read only memory (ROM), static storage, or non-volatile storage device 620 coupled to bus 615 for storing static information and instructions for processor 610, and data storage device 625 such as a magnetic disk, optical disk and its corresponding disk drive, or a portable storage device (e.g., a universal serial bus (USB) flash drive, a Secure Digital (SD) card). Data storage device 625 is coupled to bus 615 for storing information and instructions.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an ASIC or otherwise. Virtual environments can be used as well such as virtual machines implemented by software on hardware computer components.

A tangible machine-readable storage medium includes any mechanism that provides (e.g., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., ROM, RAM, magnetic disk storage media, optical storage media, flash memory devices, etc.).

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. A communication system comprising:
   a transmitter comprising transducer and an antenna, wherein the transducer is configured to combine a first polarized signal and a second polarized signal to yield a combined signal to provide to the antenna for transmission, the first polarized signal having a right-hand circular polarization and the second polarized signal having a left-hand circular polarization; and
   a receiver comprising a cross-polarization interference compensation (XPIC) module having a first input line and a second input line and a first output line and a second output line, wherein the XPIC module is configured to receive, based on receipt of the combined signal, a first down-converted digital polarized signal associated with the first polarized signal at the first input line and a second down-converted digital polarized signal associated with the second polarized signal at the second input line,
   wherein the XPIC module comprises a first complex-valued finite impulse response (FIR) filter configured to receive the second down-converted digital polarized signal and output a correction factor that cancels cross-polarization components in the first down-converted digital polarized signal, and
   wherein the XPIC module is configured to generate a first corrected polarized signal based on the first down-converted digital polarized signal and the correction factor and to provide the first corrected polarized signal at the first output line.

2. The system of claim 1, wherein the first complex-valued FIR filter is configured in accordance with first filter coefficients generated based on cross correlation of the first down-converted digital polarized signal and the second down-converted digital polarized signal against a known sequence included in the combined signal.

3. The system of claim 1, wherein the XPIC module comprises a burst detector and a correlator, the burst detector configured to detect a known sequence in the second down-converted digital polarized signal and, via a trigger, to initiate the correlator if the known sequence is detected.

4. The system of claim 3, wherein the correlator is associated with the first down-converted digital polarized signal, and wherein the correlator, in response to the trigger, is configured to determine correlation coefficients based on the first down-converted digital polarized signal and the second down-converted digital polarized signal and the known sequence.

5. The system of claim 4, wherein the XPIC module comprises a filter coefficient engine configured to receive the correlation coefficients from the correlator and to generate first filter coefficients based on the correlation coefficients, and wherein the first complex-valued FIR filter is configured in accordance with the first filter coefficients.

6. The system of claim 5, wherein the XPIC module comprises a first delay tap and a subtractor, wherein the first delay tap is configured to delay the first down-converted digital polarized signal for a time period sufficient for the first complex-valued FIR filter to output the correction factor, and wherein the subtractor is configured to generate the first corrected polarized signal by applying the correction factor to the first down-converted digital polarized signal that has been delayed by the first delay tap.

7. The system of claim 1, wherein the XPIC module comprises a second complex-valued FIR filter configured to receive the first down-converted digital polarized signal and output a second correction factor that cancels cross-polarization components in the second down-converted digital polarized signal, and
   wherein the XPIC module is configured to generate a second corrected polarized signal based on the second down-converted digital polarized signal and the second correction factor and to provide the second corrected polarized signal at the second output line.

8. The system of claim 7, wherein the first output line connects to a first receiver modem and the second output line connects to a second receiver modem comprises.

9. The system of claim 7, wherein the second complex-valued FIR filter is configured in accordance with second filter coefficients generated based on correlations between the first down-converted digital polarized signal and the second down-converted digital polarized signal.

10. The system of claim 7, wherein the correction factor and the second correction factor are updated simultaneously with each other, interleaved in time with each other, or asynchronously with each other.

11. The system of claim 1, wherein the system operates in a Ka-band frequency.

12. The system of claim 1, wherein the system comprises a wideband communication system operating at a frequency bandwidth of at least 480 MHz.

13. The system of claim 1, wherein at least one of the transmitter or the receiver is included in a satellite, a user terminal, a gateway, a repeater, or a node of a satellite communication system.

14. The system of claim 1, wherein the system comprises a non-geostationary orbit (NGO) satellite communication system and wherein the first correction factor corrects for a Doppler effect.

15. A cross-polarization interference compensation (XPIC) module configured in a receiver of a wireless communication system, the XPIC module comprising:
   a first input line and a second input line configured to receive respectively a first down-converted digital polarized signal and a second down-converted digital polarized signal based on receipt of a wireless transmission, wherein the first down-converted digital polarized signal and the second down-converted digital polarized signal are associated with respectively a first polarized signal and a second polarized signal in a combined signal of the wireless transmission, and wherein the first polarized signal has a right-hand circular polarization and the second polarized signal has a left-hand circular polarization;
   a first output line and a second output line electrically coupled to at least one modem;
   a first complex finite impulse response (FIR) filter configured to receive the second down-converted digital polarized signal and generate a correction factor that cancels cross-polarization components in the first down-converted digital polarized signal, wherein the XPIC module is configured to generate a first corrected polarized signal based on the first down-converted digital polarized signal and the correction factor and to provide the first corrected polarized signal at the first output line; and a first filter coefficient engine in communication with the first complex FIR filter and configured to adapt the first complex FIR filter over time based on the first down-converted digital polarized signal and the second down-converted digital polarized signal.

16. The XPIC module of claim 15, further comprising a burst detector and a correlator, the burst detector configured to detect a known sequence in the second down-converted digital polarized signal and, via a trigger, to initiate the correlator if the known sequence is detected.

17. The XPIC module of claim 16, wherein the correlator is associated with the first down-converted digital polarized signal, and wherein the correlator, in response to the trigger, is configured to determine correlation coefficients based on the first down-converted digital polarized signal and the second down-converted digital polarized signal and the known sequence.

18. The XPIC module of claim 17, wherein the first filter coefficient engine is configured to receive the correlation coefficients from the correlator and to generate first filter coefficients based on the correlation coefficients, and wherein the first complex-valued FIR filter is adapted in accordance with the first filter coefficients.

19. The XPIC module of claim 18, further comprising a first delay tap and an adder/subtractor, wherein the first delay tap is configured to delay the first down-converted digital polarized signal for a time period sufficient for the first complex-valued FIR filter to generate the correction factor, and wherein the adder/subtractor is configured to generate the first corrected polarized signal by applying the correction factor to the first down-converted digital polarized signal that has been delayed by the first delay tap.

20. The XPIC module of claim 15, further comprising a second complex-valued FIR filter configured to receive the first down-converted digital polarized signal and to generate a second correction factor that cancels cross-polarization components in the second down-converted digital polarized signal, and wherein the XPIC module is configured to generate a second corrected polarized signal based on the second down-converted digital polarized signal and the second correction factor and to provide the second corrected polarized signal at the second output line.

21. The XPIC module of claim 20, further comprising a second filter coefficient engine configured to generate second filter coefficients based on the first down-converted digital polarized signal and the second down-converted digital polarized signal, and wherein the second complex-valued FIR filter is adapted in accordance with the second filter coefficients.

22. The XPIC module of claim 20, wherein the correction factor and the second correction factor are updated simultaneously with each other, interleaved in time with each other, or asynchronously with each other.

23. The XPIC module of claim 15, wherein the XPIC module operates in a Ka-band frequency.

24. The XPIC module of claim 15, wherein the wireless communication system comprises a wideband communication system operating at a frequency bandwidth of at least 480 MHz.

25. The XPIC module of claim 15, wherein at least one of the transmitter or receiver is included in a satellite, a user terminal, a gateway, a repeater, or a node of a satellite communication system.

26. The XPIC module of claim 15, wherein the at least one modem comprises a burst-mode modem.

27. The XPIC module of claim 15, wherein an adaptation rate of the first complex FIR filter is slower than a burst rate associated with the first or second down-converted digital polarized signal.

28. A method comprising:

receiving a first down-converted signal, the first down-converted signal being based on a received combined signal at a cross-polarization interference compensation module, the received combined signal having a right-hand circular polarized signal and a left-hand circular polarized signal;

receiving a second down-converted signal, the second down-converted signal being based on the received combined signal;

generating, based on the second down-converted signal, a correction factor that cancels out cross-polarization components in the first down-converted signal;

generating a first corrected polarized signal based on the first down-converted signal and the correction factor; and providing the first corrected polarized signal to a first output line.

29. The method of claim 28, further comprising:

generating, based on the first down-converted signal, a second correction factor that cancels out cross-polarization components in the second down-converted signal;

generating a second corrected polarized signal based on the second down-converted signal and the correction factor; and providing the second corrected polarized signal to a second output line.

30. The method of claim 28, wherein the received combined signal comprises a dual-polarized signal.

31. A system comprising:

a-polarization interference compensation (XPIC) module configured to receive a first down-converted digital polarized signal associated with a first polarized signal of a combined signal and a second down-converted digital polarized signal associated with a second polarized signal of the combined signal, wherein the first polarized signal comprises a right-hand circular polarized signal and the second polarized signal comprises a left-hand circular polarized signal; and a complex-valued finite impulse response (FIR) filter configured in the XPIC module that receives the second down-converted digital polarized signal and outputs a correction factor that cancels cross-polarization components in the first down-converted digital polarized signal, wherein the XPIC module is configured to generate a first corrected polarized signal based on the first down-converted digital polarized signal and the correction factor.

32. The system of claim 31, further comprising:

a second complex-valued FIR filter configured in the XPIC module, the second complex-valued FIR filter configured to receive the first down-converted digital polarized signal and output a second correction factor that cancels cross-polarization components in the second down-converted digital polarized signal, wherein the XPIC module is configured to generate a second corrected polarized signal based on the second down-converted digital polarized signal and the second correction factor.

\* \* \* \* \*

UNITED STATES PATENT AND TRADEMARK OFFICE
CERTIFICATE OF CORRECTION

PATENT NO. : 11,671,162 B1
APPLICATION NO. : 17/230659
DATED : June 6, 2023
INVENTOR(S) : Martin S. McCormick It is certified that error appears in the above-identified patent and that said Letters Patent is hereby corrected as shown below:

In the Claims
- In Claim 1, Column 17, Line 18, insert -- a -- between "comprising" and "transducer".
- In Claim 8, Column 18, Line 25, delete "comprises" after "modem" and before the ".".
- In Claim 31, Column 20, Line 42, delete "a-polarization" before "interference" and insert -- a cross-polarization --.

Signed and Sealed this
Tenth Day of October, 2023

Katherine Kelly Vidal
*Director of the United States Patent and Trademark Office*